(12) United States Patent
Shibata

(10) Patent No.: US 11,475,025 B2
(45) Date of Patent: Oct. 18, 2022

(54) BLOCKCHAIN SYSTEM COMPRISING CONSENSUS PROTOCOL USING SEARCH FOR GOOD APPROXIMATE SOLUTIONS TO ANY OPTIMIZATION PROBLEM AND ITS COMPUTOR PROGRAM

(71) Applicant: Naoki Shibata, Kyoto (JP)

(72) Inventor: Naoki Shibata, Kyoto (JP)

(73) Assignee: PROOF-OF-SEARCH K.K., Tokyo (JP)

( * ) Notice: Subject to any disclaimer, the term of this patent is extended or adjusted under 35 U.S.C. 154(b) by 90 days.

(21) Appl. No.: 17/199,504

(22) Filed: Mar. 12, 2021

(65) Prior Publication Data
US 2022/0035808 A1 Feb. 3, 2022

(30) Foreign Application Priority Data

Aug. 1, 2020 (JP) .............................. JP2020-131296

(51) Int. Cl.
*G06F 16/2458* (2019.01)
*G06F 16/23* (2019.01)

(52) U.S. Cl.
CPC ...... *G06F 16/2465* (2019.01); *G06F 16/2365* (2019.01)

(58) Field of Classification Search
CPC .......................... G06F 16/2465; G06F 16/2365
USPC ...................................................... 707/690
See application file for complete search history.

(56) References Cited

U.S. PATENT DOCUMENTS

| | | | |
|---|---|---|---|
| 2019/0188046 A1* | 6/2019 | Florissi | H04L 63/0209 |
| 2019/0228133 A1* | 7/2019 | Ansari | G06F 21/10 |
| 2020/0344233 A1* | 10/2020 | Lai | G06Q 40/04 |
| 2021/0091957 A1* | 3/2021 | Ford | H04L 9/3247 |
| 2021/0234669 A1* | 7/2021 | Singh | H04L 9/0637 |
| 2021/0264420 A1* | 8/2021 | Tammana | H04L 9/3239 |

OTHER PUBLICATIONS

S. Nakamoto, "Bitcoin: A Peer-to-Peer Electronic Cash System", Accessed: Jul. 1, 2015. [Online] Available: https://bitcoin.org/ bitcoin pdf. (Dec. 2008).
A. Vries, "Bitcoin's Growing Energy Problem", Joule 2, p. 801-809, May 16, 2018, 2018 Elseview Inc., [Online] Available: https://doi. org/10.1016/j.joule.2018.04.016.

(Continued)

*Primary Examiner* — James Trujillo
*Assistant Examiner* — Fariborz Khoshnoodi
(74) *Attorney, Agent, or Firm* — IP Business Solutions, LLC

(57) ABSTRACT

The invention comprises a decentralized consensus protocol for blockchains in which the computation can be used to search for good approximate solutions to any optimization problem. This protocol allows the wasted energy to be used for finding approximate solutions to problems submitted by any nodes (called clients). This protocol works in a similar way to proof-of-work, and it makes nodes evaluate a large number of solution candidates to add a new block to the chain. A client provides a search program that implements any search algorithm that finds a good solution by evaluating a large number of solution candidates. The node that finds the best approximate solution is rewarded by the client.

12 Claims, 2 Drawing Sheets

(56) References Cited

OTHER PUBLICATIONS

P4titan, "Slimcoin a Peer-to-Peer Crypto-Currency With Proof-of-Burn "Mining without Powerful Hardware"", May 17, 2014, [Online] Available: https://github.com/slimcoin-project/slimcoinproject.github.io/raw/master/whitepaperSLM.pdf.
N. Popper, "In Bitcoin's Orbit: Rival Virtual Currencies Vie for Acceptance", The New York Time, Nov. 24, 2013, 2017 The New York Times Company, [Online]. Available: https://dealbook.nytimes.com/2013/11/24/in-bitcoins-orbit-rival-virtual-currencies-vie-for-acceptance/.
I. Bentov et al., "Proof of activity: Extending bitcoin's proof of work via proof of stake," ACM SIGMETRICS Perform. Eval. Rev., vol. 42, No. 3, pp. 34-37, 2014.
M. Ball et al., "Proofs of useful work", Feb. 27, 2017, IACR Cryptol. ePrint Arch., vol. 2017, p. 203, Accessed: Jun. 29, 2017.
R. Halford, "Gridcoin: Crypto-Currency Using Berkeley Open Infrastructure Network Computing Grid as a Proof of Work", May 23, 2014, [Online], Available: https://bravenewcoin.com/insights/crypto-currencyusing-berkeley-open-infrastructure-network-computing-grid-as-a-proofof-work.
A. Miller et al., "Permacoin: Repurposing bitcoin work for data presentation," in Proc. IEEE Symp. Secur. Privacy (SP), May 2014, pp. 475-490.
S. King, "Primecoin: Cryptocurrency With Prime Num-ber Proof-of-Work", Jul. 7, 2013, [Online]. Available: http://primecoin.io/bin/primecoinpaper.pdf.
D. P. Anderson, "BOINC: A system for public-resource computing and storage," in Proc. 5th IEEE/ACM Int. Workshop Grid Comput. (GRID). Washington, DC, USA: IEEE Computer Society, Nov. 2004, pp. 4-10.
S. Dziembowski et al., "Proofs of space", in Advances in CryptologyCRYPTO 2015, R. Gennaro and M. Robshaw, Eds. Berlin, Germany: Springer, 2015, pp. 585-605.
S. Park et al., "Spacemint: A cryptocurrency based on proofs of space", in Financial Cryptography and Data Security. Berlin, Germany: Springer, 2018, pp. 480-499.

\* cited by examiner

BLOCKCHAIN SYSTEM COMPRISING CONSENSUS PROTOCOL USING SEARCH FOR GOOD APPROXIMATE SOLUTIONS TO ANY OPTIMIZATION PROBLEM AND ITS COMPUTOR PROGRAM

CROSS-REFERENCE TO RELATED APPLICATIONS

The present application claims priority under 35 U.S.C. 119 to Japanese Patent Application No. 2020-131296, filed on Aug. 1, 2020. The contents of this application are incorporated herein by reference in their entirety.

BACKGROUND OF THE INVENTION

Field of the Invention

The invention relates to a blockchain system in which nodes joining the blockchain system can get a valid nonce by searching solution candidates of an optimization problem requested by a client, so that it enables the computational resources for searching valid nonces to be used to solve optimization problems.

Description of the Related Art

Since the introduction of Bitcoin [Non-patent document 1], there have been many cryptocurrencies built on distributed public ledgers called blockchains. A blockchain is a growing list of blocks of data items that are designed to be resistant to modification of the data. In a cryptocurrency, each transaction is registered as an item in a block. Bitcoin uses a proof-of-work (PoW)system to decide which outcome is the correct outcome of the latest transactions and prevent double-spending of coins. In a PoW system, the participating nodes are asked to do some computational task to make a majority decision on a one-CPU-one-vote basis. While PoW works very robustly against misbehavior and malicious participants on a network where impersonation is easy, the very large amount of electricity expended by PoW systems is becoming a problem. The estimated energy consumed by Bitcoin was at least 2.55 gigawatts in 2018, which is comparable to the electricity consumed in countries such as Ireland (3.1 gigawatts) [Non-patent document 2]. To address this problem, various alternatives to PoW and distributed public ledgers based on different working principle shave been proposed. Although many of the alternative methods exhibit better energy efficiency than PoW, some of these methods introduce a single point of failure, or they have to trust an external party. The main advantage of PoW is that it does not need to trust anything except that it requires a majority of CPU power to be controlled by honest nodes. There are only a few alternative methods that satisfy this condition. Bitcoin and cryptocurrencies based on PoW are still predominant because of their unparalleled security and robustness.

Bitcoin [Non-patent document 1] is a robust, secure and decentralized cryptocurrency. It is built on a peer-to-peer distributed timestamp server that generates computational proof of the chronological order of transactions. This proof is provided by a PoW system. In Bitcoin, PoW is used to enforce majority decision making on a one-CPU-one-vote basis on peer-to-peer networks where a user can allocate many IP addresses and one-IP-address-one-vote does not work. The distributed timestamp server in Bitcoin works by forming a linked list of blocks of data items to be time-stamped. This linked list is called a blockchain. Each block contains the hash value of the last block and the data items. Each time a new block is added to the chain, a hash value of the new block is computed and widely published. The PoW in Bitcoin involves finding a value whose hash value begins with a required number of zero bits. Each block has an entry for an integer value called a nonce, and only a block that has a nonce that makes the block's hash value begin with the required number of zero bits is accepted as a valid block. An incentive is provided to nodes that support the network such that a new coin is given to a node that succeeds in adding a new block. Network nodes that try to add blocks are called miners. Honest miners try to add a new block to the longest chain. As long as a majority of CPU power is controlled by honest miners, an honest chain will grow the fastest. In this way, a majority decision is made. The time required for a block to be added is called the block time. The required number of zero bits is automatically adjusted to make the expected block time 10 minutes. Bitcoin is not a mere online payment system; it aims at replacing a currency. For this purpose, the system has to be extremely robust, and it does not depend on any party or computing node. The Bitcoin entity is the data in the network. It will never vanish into nothing as long as there are enough honest nodes. Bitcoin has the following properties:

a) Decentralized and self-regulated
b) No need to trust any node or any party
c) Hard to modify the data in the blocks
d) Immune to Sybil attacks
e) The winning probability for each miner is proportional to its computational power
f) Legitimacy of blocks can be quickly verified at anytime by any node
g) Any node can join at anytime without preregistration However, Bitcoin requires miners to use their computational resources for PoW, which is basically the repeated calculation of hash values. This requirement is a waste of computational resources and electricity, which could be applied to useful work.

To address the wasted computational resources and energy used by Bitcoin, various alternative consensus protocols for blockchains have been proposed. Proof-of-stake and proof-of-burn [Non-patent document 3] are techniques used in some of the recently developed cryptocurrencies. Proof-of-stake, which was first implemented in Peercoin [Non-patent document 4], is a consensus protocol that chooses the creator of the next block based on combinations of random selection and wealth or age. With this protocol, the node that has more coins will create blocks more often, and thus more coins are granted. In this protocol, the designated creator of the next block has to be trusted. The richest nodes are more likely to be selected, and thus they have control of the network. Proof-of-activity [Non-patent document 5] is a combination of PoW and proof-of-stake. In this scheme, miners work on PoW to add an empty block header. In this header, a random group of validators are designated in the same way as in proof-of-stake. These validators are asked to sign the new block. If the new block is signed by all the chosen validators, it is added to the chain. The advantage of proof-of-activity is that it requires both a majority of CPU power and a majority of coins to take control of the cryptocurrency.

With proof-of-useful-work [Non-patent document 8], Gridcoin [Non-patent document 9] and Permacoin [Non-patent document 8], computational resources in consensus formation can be used for more meaningful purposes. In proof-of-useful-work [Non-patent document 6] and Primecoin [Non-patent document 9], the computation for making a consensus is used for more meaningful purposes than the calculation of hash values. Proof-of-useful-work uses the computation to solve the Orthogonal Vectors problems, while Primecoin makes a consensus by searching for chains of prime numbers. However, it is not clear how much public demand there is to find solutions to such problems. Gridcoin [Non-patent document 7] implements a proof-of-research scheme, which rewards miners who perform computations on the Berkeley Open Infrastructure for Network Computing (BOINC) [Non-patent document 10]. The computation for the consensus protocol is used for scientific computations, so the energy is used for very meaningful purposes; however, the cryptocurrency system has to depend on the BOINC system. This means that Gridcoin will cease to work if the BOINC system goes down, and thus, Gridcoin is less robust than Bitcoin.

Proof-of-space [Non-patent document 11] is a protocol between a prover and a verifier where the prover is supposed to store some large amount of data. A verifier asks a prover to send a piece of data to check whether it is still storing the data. The protocol is designed to make the computation, storage requirements and communication complexity of the verifier small. To use proof-of-space in a decentralized blockchain, a way of determining the winning node and a way for each miner to know how likely it is to win are required. The probability of winning should be proportional to the space allocated for data storage in each node. These practical considerations are discussed in [Non-patent document 12]. As mentioned in the paper, proof-of-space has its own weaknesses. One of the problems is that nodes can mine on multiple chains simultaneously. Miners can also try creating many different blocks with a single proof-of-space by altering the block contents slightly and announcing the most favorable one.

RELATED ART DOCUMENTS

Non-Patent Documents

Non-patent document 1 S. Nakamoto. (December 2008). Bitcoin: A Peer-to-Peer Electronic Cash System. Accessed: Jul. 1, 2015. [Online]. Available: https://bitcoin.org/ bitcoin.pdf Non-patent document 2 A. Vries. (May 2018). Bitcoin's Growing Energy Problem. [Online]. Available: http://doi.org/10.1016/j.joule.2018.04.016

Non-patent document 3 P4Titan. (2014) Slimcoin a Peer-to-Peer Crypto-Currency With Proof-of-Burn. [Online]. Available: https://github.com/slimcoinproject/slimcoin-project. github.io/raw/master/whitepaperSLM.pdf Non-patent document 4 N. Popper. (November 2013). In Bitcoin's Orbit: Rival Virtual Currencies Vie for Acceptance. [Online]. Available: https://dealbook.nytimes.com/2013/11/24/in-bitcoins-orbit-rival-virtual-currencies-vie-for-acceptance/

Non-patent document 5 I. Bentov, C. Lee, A. Mizrahi, and M. Rosenfeld, "Proof of activity: Extending bitcoin's proof of work via proof of stake," ACM SIGMETRICS Perform. Eval. Rev., vol. 42, no. 3, pp. 34-37, 2014.

Non-patent document 6 M. Ball, A. Rosen, M. Sabin, and P. N. Vasudevan, "Proofs of useful work," IACR Cryptol. ePrint Arch., vol. 2017, p. 203, February 2017. Accessed: Jun. 29, 2017.

Non-patent document 7 R. Halford. (May 2014). Gridcoin: Crypto-Currency Using Berkeley Open Infrastructure Network Computing Grid as a Proof of Work. [Online]. Available: https://bravenewcoin.com/insights/crypto-currencyusing-berkeley-open-infrastructure-network-computing-grid-as-a-proofof-work Non-patent document 8 A. Miller, A. Juels, E. Shi, B. Parno, and J. Katz, "Permacoin: Repurposing bitcoin work for data preservation," in Proc. IEEE Symp. Secur. Privacy (SP), May 2014, pp. 475-490.

Non-patent document 9 S. King. (July 2013). Primecoin: Cryptocurrency With Prime Num-ber Proof-of-Work. [Online]. Available: http://primecoin.io/bin/primecoinpaper.pdf Non-patent document 10 D. P. Anderson, "BOINC: A system for public-resource computing and storage," in Proc. 5th IEEE/ACM Int. Workshop Grid Comput. (GRID). Washington, D.C., USA: IEEE Computer Society, November 2004, pp. 4-10.

Non-patent document 11 S. Dziembowski, S. Faust, V. Kolmogorov, and K. Pietrzak, "Proofs of space," in Advances in CryptologyCRYPTO 2015, R. Gennaro and M. Robshaw, Eds. Berlin, Germany: Springer, 2015, pp. 585-605.

Non-patent document 12 S. Park, A. Kwon, G. Fuchsbauer, P. Ga°i, J. Alwen, and K. Pietrzak, "Spacemint: A cryptocurrency based on proofs of space," in Financial Cryptography and Data Security. Berlin, Germany: Springer, 2018, pp. 480-499.

SUMMARY OF THE INVENTION

The present invention provides a blockchain system comprising a new decentralized consensus protocol for blockchains, called proof-of-search (PoS), which has all the seven advantages of proof-of-work explained in the paragraph [0004]. PoS allows the computational power wasted in proof-of-work to be used for searching for an approximate solution of an instance of an optimization problem. It allows any node to submit a job that includes a program called an evaluator that evaluates a solution candidate of a problem to be solved. In this protocol, a concatenation of a solution candidate and its evaluation value is used as a nonce instead of an integer. To generate a valid nonce, a node has to execute the evaluator to evaluate some solution candidate. Since a large number of nonces have to be generated in the consensus process, a large number of solution candidates have to be evaluated. To prevent collusion between nodes, the present protocol has two separate ways of rewarding nodes. A node that succeeds in adding a new block is rewarded in the same way as in PoW. A node that succeeds in finding the best solution of an optimization problem is given the charge paid by the corresponding client. A client can submit a job without mining, and a miner is not required to submit a job. If no job is submitted to a PoS-based blockchain, it automatically adds an empty job, which makes PoS work in a similar way to PoW. In this application, a solution means an approximate solution. To solve a problem is to find an approximate solution of the problem.

DETAILED DESCRIPTION

Figure 1:
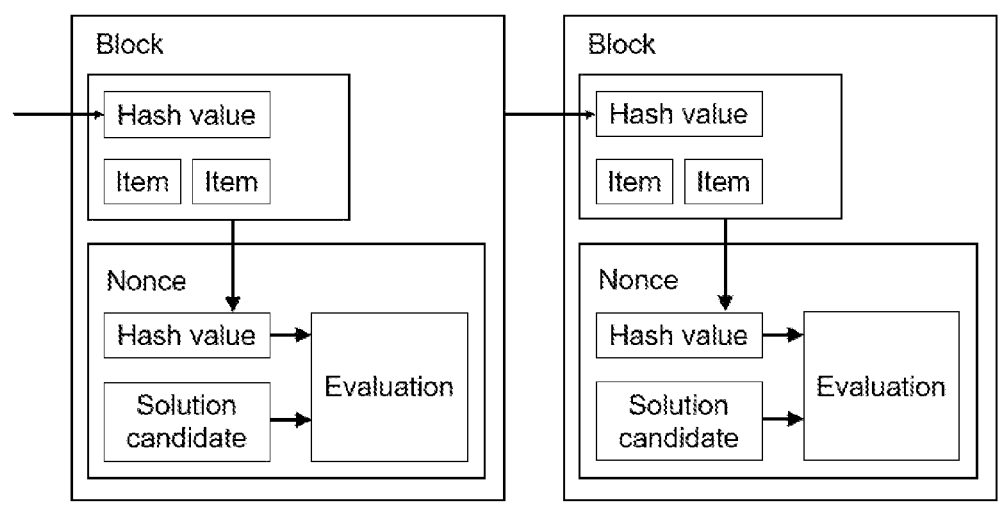
FIG. 1. shows the data structure of a blockchain with a minimal PoS scheme.

The applicant first introduces the concepts of an evaluator, a client and a job. An evaluator is a computer program that deterministically computes the evaluation value of a given solution candidate of an instance of an optimization problem. An evaluator has to always output the same value if the same input is given regardless of the platform it runs on. An evaluator includes an instance of a problem. A job is data that represents an execution request for a search for a solution of an optimization problem. A job includes an evaluator and all necessary information regarding the search request. Any node can submit a job to a PoS-based blockchain, and the node submitting a job is called a client. A job can be submitted to the system by registering the job on the blockchain. The ID of the client is also included in a job. For example, a client can implement an evaluator to evaluate a solution candidate of an instance of the traveling salesman problem (TSP). In this case, an order for visiting the cities is an input for the evaluator, and the evaluator outputs the total length of the tour. In PoS, a concatenation of a solution candidate and its evaluation value is used as a nonce. A PoS-based blockchain chooses an evaluator from submitted jobs and specifies which evaluator is used to generate a valid nonce to add the next block. To add a new block, a mining node has to find a nonce that makes the block's hash value begin with a required number of zero bits, in the same way as in a PoW. However, unlike PoW, not every nonce is valid. To generate a valid nonce, a node executes the specified evaluator to evaluate some solution candidate. A valid nonce has to contain a solution candidate and its evaluation value. Since miners have to generate a large number of hash values to add a new block, the miners can be enforced to evaluate a large number of solution candidates. By requiring a valid nonce that makes the block's hash value begin with a required number of zero bits, the system provides a probabilistic proof that the miners have evaluated large number of solution candidates. To verify a hash value means to execute the evaluator with the solution candidate in the nonce and conrm that the resulting evaluation value matches the one included in the nonce. Then the hash value of the block is also checked to see if it begins with the specified number of zero bits. To make verification quick, evaluation also has to be quick.

There are two objectives for evaluation. One is to find a nonce that begins with a required number of zero bits. Another objective is to find a good solution with a good evaluation. In PoS, it is assumed that large number of solution candidates have to be evaluated to find a good solution. A node that succeeds in finding the best solution among all nodes will be rewarded by the client. To make this search efficient, a client provides a computer program called a searcher that implements a randomized search algorithm such as a genetic algorithm. A searcher is included in a job, executed by miners. Internally, it calls the evaluator many times. Each time an evaluation is made inside the searcher, it automatically calculates the hash value of the block to check whether it begins with the required number of zero bits and broadcasts it if it does. The search continues until a new block is added.

In PoW, there is no need to guard against reuse of the results of computations from the past. This is because the only way to obtain a hash value is to compute the hash function and because the ID of the miner and the last block are associated with the hash value. In PoS, however, it is necessary to guarantee that an evaluation is made each time a block's hash value is generated. Because the amount of computation in an evaluation can be substantially larger than that for calculating a hash value, miners might try to reuse the results of evaluations by sharing them among different nodes. To prevent this, the result of evaluation must be associated with the ID of the miner and other data. To do this, the evaluator is made to take the hash value of all the items in a block except the nonce itself as the second argument. A tiny amount of error is introduced in the output of an evaluator to make the output depend on the second argument. The algorithm for introducing this error has to be devised and implemented differently by each client. This is like using an evaluator as a substitute for a hash function. However, such a property is not strictly required for an evaluator. If an evaluator is executed twice with the same solution candidate given for the first argument and different values for the second argument, then it should be infrequent that the same value is returned. However, this is not strictly prohibited. This will be further discussed in IV-A.

FIG. 1 shows the data structure of a blockchain with a minimal PoS scheme. This minimal scheme works with a single fixed evaluator, and it does not have a functionality for searching for a good solution. A blockchain with this scheme works in a similar way to a blockchain with PoW. In the next subsections, how to enhance this minimal scheme to add functionalities for submission of jobs, payment and execution of multiple jobs are described.

PoS has following three properties.
a) A miner has a financial incentive to find and provide a good solution.
b) A node is not incentivized to submit a problem instance for which it already knows a good solution.
c) Submitting a problem instance that is not worth solving is financially discouraged.

PoS blockchain system especially needs to be prepared for the case where a client knows a good solution for its job. The possible motivations for submitting such a job are listed below.
1) It is advantageous in adding a block.
2) It is rewarded by minted coin.
3) The node can make a profit by finding a good solution.

PoS blockchain system needs to give honest miners a financial incentive to find a good solution while preventing malicious miners from making a profit. In PoS, this is realized by making a client pay a charge for its job. Finding the solution with the best evaluation is only rewarded by this charge, and in this way, PoS will have all the properties listed above. For item 1, knowing or finding a good solution is not advantageous in adding a block, as explained in III-A. For item 2, finding a good solution is not rewarded by minted coins. For item 3, a client cannot make a profit by finding a good solution with the job it submitted. Since a client has to pay the charge for its job, a client will only submit a problem instance that is worth the charge. In PoS, the payment process must be fully automated without trusting any node. To ensure that the charge is paid, it is collected before the execution of a job. A client first submits a job including the charge. Then, the PoS-based blockchain automatically deducts the charge before execution of the job and pays it to the winner after completion of the job. The found solution has to be sent to the client. If a node simply broadcasts its solution to the network, this solution can be stolen by another node. If a node encrypts the solution with the public key of the client, the corresponding private key has to be published afterward, and the client has to be trusted to do that. To make sure that the node that found the best solution is paid automatically without having the solution stolen by other nodes and without trusting any node, each node first registers the evaluation value of the found solution and the hash value of a concatenation of its ID and the solution on the blockchain. Then, in the next block time, each node checks whether its solution is the best. The winning node registers its solution on the blockchain, and then the charge is paid to the winning node after confirming that the solution is genuine.

Figure 2:
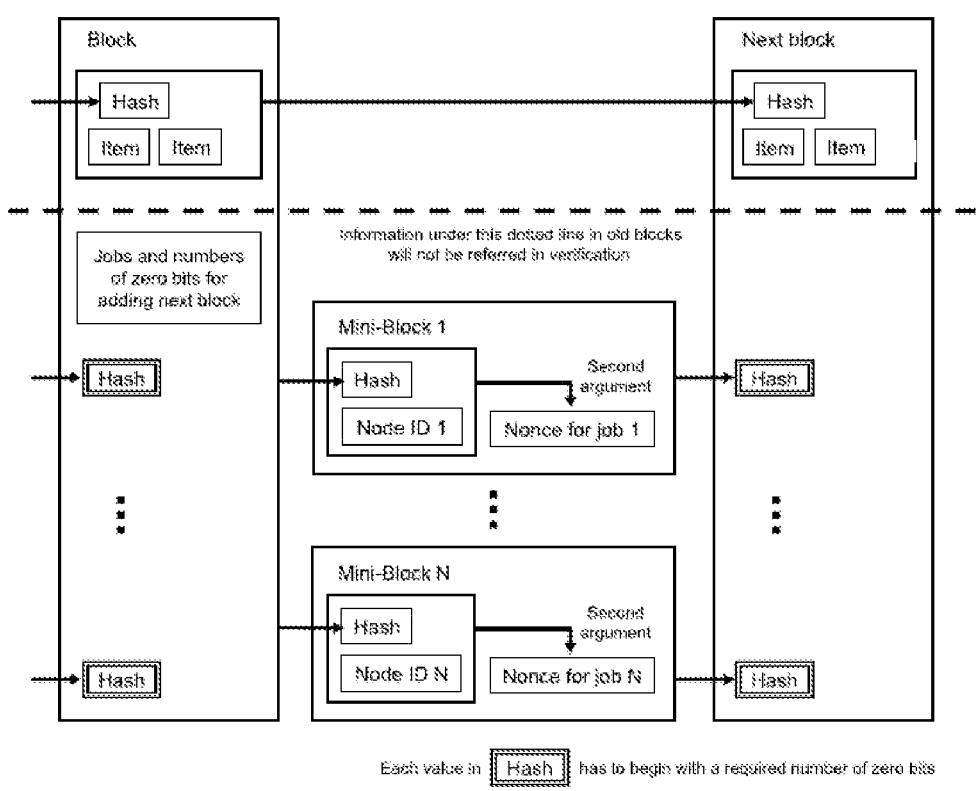
FIG. 2. shows the server of decentralized time stamp.

In PoS, because miners can execute multiple jobs at a time, the charge can be reasonable. The winning probability of each node is proportional to the computational power spent for the job. To realize this, the block time is adjusted according to the job size. However, this method has the problem of an increased probability of fork occurrence because the probability depends on the block time. In order not to increase the probability of fork occurrence, miniblocks are added between blocks without changing the block time. Each miniblock corresponds to a job. A miniblock consists of only a nonce, the ID of the mining node, and the hash value of the last block, as shown in FIG. 2. Miners try to find a valid nonce of any miniblock that makes the miniblock's hash value begin with the required number of zero bits. As explained in III-A, a valid nonce contains a solution candidate for the corresponding job and its evaluation value. Each time such a nonce is found, the node adds the corresponding miniblock by broadcasting the miniblock with that nonce. A block is added when all the miniblocks are added for all the jobs specified by the PoS based blockchain. New coins are awarded to all the nodes that add the miniblocks. Verification of hash values requires repeating the process explained in III-A for each miniblock. Because of message delivery delay in a network, there could be a difference in the sets of messages received by two different nodes. Consequently, two mining nodes may have different sets of items to be included in a new block. Thus, two different nodes may be executing the jobs to add different blocks. In other words, these nodes are executing their jobs to add miniblocks that contain the hash values of different blocks. To prevent a mini-fork and make a larger number of nodes work to add the same block, miners are forced to execute jobs on the longest chain whenever possible. Here, one chain is longer than another if it has more blocks. If two chains have the same number of blocks, the chain with more miniblocks after the last block is longer. When a node receives a new miniblock added by another node, it checks whether the chain associated with the new miniblock is longer. If this chain is valid and longer, the node immediately starts executing jobs on it. When a node adds a new miniblock, it also broadcasts the corresponding block and all the added miniblocks that come after the block.

To implement PoS, an execution environment is needed for evaluators and searchers. Since any user can submit a job, an evaluator can be inappropriately implemented. In case the evaluator takes too many steps for execution, there must be a way to terminate this execution after a specified number of steps. To make execution of the evaluator deterministic, this step count has to be exact. If an evaluator crashes or is terminated, it is regarded as returning the worst evaluation. It is possible that a searcher takes too much computation compared to the evaluator. This can be easily detected by checking the number of steps. In this case, a miner is allowed to switch the search algorithm to a simple random search. By doing this, the node can increase its hash rate while it would be less likely to find the best solution. In summary, the execution environment has to satisfy the following conditions.
a) It allows safe execution of untrusted code.
b) It provides a way to guarantee that an evaluator run deterministically.
c) It counts the number of steps of execution in a platform independent way.
d) It returns the number of steps after execution.
e) It terminates execution after a specified number of steps.
Implementing an interpreter-based virtual machine for the execution environment satisfying all the above conditions should be straightforward. Execution can be made deterministic by not providing APIs that make execution nondeterministic.

With the method explained above, all the evaluators recorded in a blockchain have to be executed to verify a chain. However, the size of an evaluator will be significantly larger than a hash value, and the storage space for keeping all the evaluators can become a heavy burden in managing a blockchain. The required storage size can be reduced by relaxing the requirements for verification of a chain. If the participants think that it is sufficient to verify a certain number of blocks, then the information regarding the jobs recorded in the older blocks can be discarded. In FIG. 2, only the hash value above the dotted line is checked during verification of old blocks, and therefore the information below the dotted line can be discarded for old blocks. Even with this relaxed method of verification, it is very hard to modify the items in the old blocks without redoing all the PoS for the new blocks.

The protocol of this invention is an enhancement of PoW, and thus, it uses common techniques with PoW. A blockchain with the present protocol is structured as a peer-to-peer network. The entire network is loosely connected without a fixed topology. In order for a node to join a network, it has to know one of the nodes that is already part of the network. Each node connects to several random nodes. A message is broadcast with a gossip protocol. Each node retains a copy of the entire information of a blockchain. The present protocol allows any client to submit a job and receive the solution. This is very simple from the point of view of a client, as shown in Algorithm 1. Executing a job and making the resulting payment take at least 4 block times. The following is how a job is processed in the fastest scenario.

Algorithm 1: Place a Job Execution Request
Input: Job request q
Output: Best found solution s
1: Register q to the blockchain.
2: Wait until a solution s is received.
3: returns
   Block time 0; A job is broadcast by the client.
Block time 1; Validity of the job is inspected. The charge is deducted from the client's account. This job is chosen for execution in block time 2.
Block time 2; The job is executed.
Block time 3; Each node broadcasts the hash value of the found solution. These hash values are registered on the blockchain.
Block time 4; The charge is paid to the node that found the best solution.

Job execution and payments are all processed by miners. Miners process jobs in a pipelined manner. Algorithm 2 shows how they are processed from the miner's point of view.

Algorithm 2: Mine
1: Wait until a new block is added.
2: Set activeChain to the added block.
3: while true do
4:   {Process for the jobs that will be executed in the next block time}
5:   Create the list of valid unexecuted jobs.
6:   Choose the jobs that will be executed in the next block time.
7:   Deduct the charge of these jobs from the client.
8:   Include these jobs in the block being added.
9:   {Process for the jobs that is executed in the current block time}

10: Verify newly received items (transactions) and put them in the block being added.
11: {Process for the jobs that were executed two block times before}
12: Check the blockchain to see whether the solutions found two block times before were the best solutions, as explained in the paragraph [0016]. Register the solutions to the blockchain if they were the best.
13: {Process for the jobs that were executed three block times before}
14: Check whether the registered solutions are genuine. Process payment of the corresponding charge.
15: repeat
16: Execute one of unfinished jobs listed in the previous block, until a new miniblock is received.
17: Register the hash value of the found solution to the blockchain (see the paragraph [0016]). This hash value will be included in the next block.
18: Verify that the chain associated with the received miniblock by calling Algorithm 3.
19: if the miniblock is valid and the corresponding chain is longer then
20: Change activeChain to the chain with the miniblock.
21: Move the items in orphaned blocks to the list of newly received items.
22: end if
23: until a new block is added
24: end while There are two threads running in parallel, and Algorithm 2 runs on one of them. In the other thread, the received items are enqueued in the list of newly received items. To register an item on the blockchain, it has to be broadcast to the network. When these items are received by a miner, they are enqueued in the list. After Algorithm 2 starts, the miner first chooses the chain to work on (line 1-2). There can be multiple valid chains, and they all begin with the same block. One specific sequence of block, or a chain, can be specified by the last block. The miner starts working on the chain associated with the first block received. At line 5, the balance of the client's account is checked. At line 8, to make all the miners work on the same set of jobs, a consensus has to be made on the set of jobs and the corresponding numbers of zero bits before the miners start working on them. At line 16, a searcher is executed in the execution environment explained in III-D. As an example of a searcher, a random search algorithm is shown in Algorithm 4. As explained in the paragraph [0012], this searcher internally calls the corresponding evaluator. Each time an evaluator is called, it automatically creates the nonce with the result of evaluation and checks the hash value to see if it begins with the required number of zero bits. If it does, the new miniblock is broadcast, and the execution of the searcher is terminated. The execution of the searcher also terminates if a new miniblock is added by another mining node. Please note that when a new block is added, the last miniblock for that block is also added. At line 18, the chain associated with a miniblock is verified. This procedure is shown in Algorithm 3. This algorithm works as explained in the paragraphs [0017] and [0019]. There is no need to verify blocks and miniblocks if exactly the same blocks or miniblocks are included in a chain previously verified by that node. At line 21, the items contained in orphaned blocks are moved to the list of newly received items. An orphaned block is a block that was a part of the chain worked on by the miner, but is no longer a part of the chain because the miner is now working on another chain.

Algorithm 3: Verify
Input: Miniblock b
Output: Verifies the chain corresponding to b and returns true if it succeeds.
1: for all blocks k in the chain pointed by b in chronological order do
2: if the same block ask is included in a previously verified chain then
3: continue
4: end if
5: Check all the transactions in k and return false if it fails.
6: if k is old then
7: Do relaxed verification explained in the paragraph [0019] and return false if it fails.
8: else
9: for all miniblocks m between k and the next block do
10: if the same miniblock as m is included in a previously verified chain then
11: continue
12: end if
13: Execute the evaluator and check whether the nonce and all the hash values satisfy the corresponding requirements and return false if it fails.
14: end for
15: end if
16: end for
17: return true Algorithm 4: Random Search
Input: Hash h of the block to be added, node ID id, evaluator ev
Output: The best solution candidate found in the search
1: bests:=null; beste=null
2: repeat
3: Generate a random solution candidate s.
4: e:=ev(s; hash(h, id))
5: if e is better than beste then
6: beste:=e; bests:=s
7: end if
8: h:=hash(h, id, s, e)
9: if h begins with the required number of zero bits then
10: broadcast the miniblock.
11: break
12: end if
13: until a new miniblock is received
14: return [bests, beste]

Suppose that a client has an instance of an optimization problem to be solved. He implements an evaluator and a searcher for the problem and decides the amount of charge to pay for solving this problem. He then constructs a job by combining the evaluator, the searcher and the charge and submits this job as explained in Algorithm 1. The charge is automatically withdrawn after registering the job. The expected amount of computation for this job is proportional to the charge. Miners work for the blockchain to find a good solution to the problem. The found solution is eventually registered to the blockchain, and thus, the client will obtain the found solution in exchange for the charge. It is assumed that there are always many miners trying to add a new block to the chain. Suppose that a new block time for the longest chain has just started. The chain provides multiple jobs to work on, and a miner chooses a job from these. If there is no job submitted by clients, it falls back to PoW, and empty jobs for finding a nonce that makes the block's hash value begin with the required number of zero bits are automatically inserted. The miner extracts a searcher and an evaluator from the job and executes the searcher. Upon execution of the searcher, the searcher calls its evaluator many times, and the searcher generates and evaluates many solution candidates. When a miner finds a good solution candidate, it keeps that solution candidate for later use. Each time a miner evaluates a solution candidate, it also generates a valid nonce, and the miner calculates the hash value of the miniblock including this nonce. If the hash value begins with the required number of zero bits, then the miner broadcasts the miniblock containing the found nonce, in addition to the last block. A miner that succeeds in adding a new miniblock is rewarded in the same way as in PoW. When a miner notices that a new miniblock is added, the miner starts working on a new miniblock that comes after the previous block broadcast with the new miniblock in order to prevent a mini-fork. A block time continues until all the miniblocks are added. After a block time ends, a miner registers his best found solution to the blockchain. The node that succeeded in finding the best solution for a job is given the charge included in the job.

Now, suppose that a client and a miner are colluding to obtain an unfair amount of coins. In order for this miner to add a new block, he has to find a valid nonce that makes the hash value begin with the required number of zero bits. This is essentially picking a random solution candidate and calculating the hash value. The problem and its solution do not matter for this, and therefore there is no merit in a client and a miner to colluding. On the other hand, a client can carry out computation for its job before submitting it and tell the solution to a colluding miner. However, there is no benefit for doing this since the resulting reward is paid by the client to the colluding miner. This is effectively the client sending its coin on the colluding miner, which is a normal transaction in a cryptocurrency.

Summary of the frow of coins and the incentive mechanism is as follows. Each client pays the charge when it registers its job. This charge is automatically withdrawn upon registration and kept by the system until the completion of the job. The registered job is eventually executed by miners. After execution of the job, the system knows which miner found the best solution for each job. The system pays the kept charge to the account of the miner who found the best solution. Incentive for adding a new miniblock: The system decides the required number of zero bits in the hash value for each miniblock according to the charge paid for the job, as explained in the paragraph [0017]. When a block time begins, each miner chooses a miniblock to work on, and executes the corresponding searcher. A large number of nonces are generated upon execution of the searcher. Each time a nonce is generated, the miner checks whether the hash value of the miniblock including the generated nonce begins with the required number of zero bits. If it does, the miner succeeds in adding a new miniblock, and the miner receives the reward for the new miniblock. The amount of this reward is set according to the required number of zero bits in the hash value, as explained in the paragraph [0017].

The consensus protocol for blockchains of the present invention enables the wasted energy in the proof-of-work system to be used for solving optimization problems submitted by any user. Cryptocurrencies based on proof-of-work are already very popular, and to replace those cryptocurrencies, the protocol of the present invention is robust, secure and decentralized. The protocol of the present invention is better than Gridcoin in that sense since the protocol does not depend on any external organization or system.

There will be three kinds of users of a PoS-based blockchain, and these three user groups can be independent of each other. The first kind of users is those who want to use a PoS-based blockchain as a payment method. The second kind of users is those who spend their computational resources to earn e-coins. The existing blockchains already have these two kinds of users, and PoS adds a third kind of user who uses a PoS-based blockchain as a grid computing infrastructure. The computational service provided by the present protocol would be beneficial for computation tasks whose intermediate results can be published. Considering the popularity of BOINC projects and public clouds, the applicant expects that there is a large public demand for such a computational service. The computation in the protocol of the present invention is ASIC resistant. This would make mining with ordinary CPUs more profitable. Unlike cloud computing, the computers used in mining need not be reliable. Since the computational resources are no longer wasted, public organizations and more general users could be expected to join. This would make a blockchain with the protocol of the present invention more decentralized than existing ones.

What is claimed is:

1. A blockchain system operated by nodes joining a peer-to-peer network, comprising:
   a plurality of nodes in which each node has a means to create jobs, to broadcast the jobs to a blockchain and to verify a genuineness of blocks which the node receives from other nodes; and
   a plurality of blocks in which each block includes a hash value of the last block in the blockchain and one or more jobs selected from the jobs broadcasted to the blockchain and one or more nonces,
   wherein the nonce is a combination of a solution candidate of the optimization problem of a corresponding job in the block or one of the previous blocks and an evaluated value of the solution candidate, and the block is genuine only when the solution candidate and an evaluated value of the solution candidate coincide for each nonce in the block.

2. The blockchain system of claim 1, wherein
   each node has a means to create miniblocks, to broadcast the miniblocks to the blockchain and to verify the genuineness of miniblocks which the node receives from other nodes,
   each block includes one or more miniblocks,
   each miniblock consists of the hash value of the part of the block other than the miniblocks, an ID of the node that creates the miniblock, an ID of a job selected from the broadcasted jobs, and a nonce,
   the miniblock is added to a block only when the hash value of the miniblock begins with a required number of zero bits, and
   the block is added to the end of the blockchain only when all the miniblocks corresponding to all the jobs requested have been added to the block.

3. The blockchain system of claim 2, wherein
   each job includes the ID of the node that created the job, an optimization problem of which the node wants to get the best approximate solution, the charge to pay for solving the problem, and an evaluator,
   the evaluator is a program which evaluates solution candidates and gives evaluation values, and the node that broadcasted the solution candidate with the highest evaluation value is given the charge of the job.

4. The blockchain system of claim 1, further comprising:
   a function to count the number of steps of the execution to search the solution candidate deterministically,
   a function to return the number of steps,
   and a function to terminate the program of searching a solution candidate after a specified number of steps executed.

5. The blockchain system of claim 2, further comprising:
   a function to count the number of steps of the execution to search the solution candidate deterministically, a function to return the number of steps, and a function to terminate the program of searching a solution candidate after a specified number of steps executed.

6. The blockchain system of claim 3, further comprising:

a function to count the number of steps of the execution to search the solution candidate deterministically, a function to return the number of steps, and a function to terminate the program of searching a solution candidate after a specified number of steps executed.

7. A non-transitory computer readable medium including computer program which realizes a blockchain system operated by nodes joining a peer-to-peer network, the blockchain system comprising:

a plurality of nodes in which each node has a means to create jobs, to broadcast the jobs to the blockchain and to verify the genuineness of blocks which the node receives from other nodes; and a plurality of blocks in which each block includes a hash value of the last block in the blockchain and one or more jobs selected from the jobs broadcasted to the blockchain and one or more nonces, wherein the nonce is a combination of a solution candidate of an optimization problem of a corresponding job in the block or one of the previous blocks and an evaluated value of the solution candidate, and the block is genuine only when the solution candidate and an evaluated value of the solution candidate coincide for each nonce in the block.

8. The non-transitory computer readable medium according to claim 7, wherein each node has a means to create miniblocks, to broadcast the miniblocks to the blockchain and to verify the genuineness of miniblocks which the node receives from other nodes, each block includes one or more miniblocks, each miniblock consists of the hash value of the part of the block other than the miniblocks, an ID of the node that creates the miniblock, an ID of a job selected from the broadcasted jobs, and a nonce, the miniblock is added to a block only when the hash value of the miniblock begins with a required number of zero bits, and the block is added to the end of the blockchain only when all the miniblocks corresponding to all the jobs requested have been added to the block.

9. The non-transitory computer readable medium according to claim 8, wherein each job includes the ID of the node that created the job, an optimization problem of which the node wants to get the best approximate solution, the charge to pay for solving the problem, and an evaluator, the evaluator is a program which evaluates solution candidates and gives evaluation values, and the node that broadcasted the solution candidate with the highest evaluation value is given the charge of the job.

10. The non-transitory computer readable medium according to claim 7, further comprising:

a function to count the number of steps of the execution to search the solution candidate deterministically, a function to return the number of steps, and a function to terminate the program of searching a solution candidate after a specified number of steps executed.

11. The non-transitory computer readable medium according to claim 8, further comprising:

a function to count the number of steps of the execution to search the solution candidate deterministically, a function to return the number of steps, and a function to terminate the program of searching a solution candidate after a specified number of steps executed.

12. The non-transitory computer readable medium according to claim 9, further comprising:

a function to count the number of steps of the execution to search the solution candidate deterministically, a function to return the number of steps, and a function to terminate the program of searching a solution candidate after a specified number of steps executed.

* * * * *